US010113495B2

(12) United States Patent
Hiroe et al.

(10) Patent No.: US 10,113,495 B2
(45) Date of Patent: Oct. 30, 2018

(54) EXHAUST GAS RECIRCULATION DEVICE FOR INTERNAL COMBUSTION ENGINE

(75) Inventors: Takaharu Hiroe, Tokyo (JP); Kazunari Ide, Tokyo (JP); Tomohide Yamada, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 339 days.

(21) Appl. No.: 13/697,202

(22) PCT Filed: Sep. 12, 2011

(86) PCT No.: PCT/JP2011/070707
§ 371 (c)(1),
(2), (4) Date: Jan. 22, 2013

(87) PCT Pub. No.: WO2012/039308
PCT Pub. Date: Mar. 29, 2012

(65) Prior Publication Data
US 2013/0139794 A1 Jun. 6, 2013

(30) Foreign Application Priority Data

Sep. 21, 2010 (JP) ................................. 2010-211406

(51) Int. Cl.
*F02D 41/00* (2006.01)
*F02M 26/05* (2016.01)
*F02M 26/49* (2016.01)

(52) U.S. Cl.
CPC ....... *F02D 41/0077* (2013.01); *F02D 41/005* (2013.01); *F02D 41/0047* (2013.01);
(Continued)

(58) Field of Classification Search
CPC ........... F02M 25/0702; F02M 25/0756; F02M 26/49; F02M 2026/001; F02D 41/0065;
(Continued)

(56) References Cited

U.S. PATENT DOCUMENTS 4,445,483 A * 5/1984 Hasegawa ...................... 123/492
4,665,882 A * 5/1987 Otobe ....................... 123/568.16
(Continued)

FOREIGN PATENT DOCUMENTS

EP 0837237 A2 4/1998
EP 1 174 614 A1 1/2002
(Continued)

OTHER PUBLICATIONS

European Search Report dated Jul. 8, 2014 issued in corresponding EP application No. 11826754.1.
(Continued)

*Primary Examiner* — Lindsay Low
*Assistant Examiner* — Robert Werner
(74) *Attorney, Agent, or Firm* — Birch, Stewart, Kolasch & Birch, LLP

(57) ABSTRACT

An exhaust gas recirculation device for an internal combustion engine includes: an opening command signal output unit 52 which outputs an opening command signal in relation to an EGR control valve on the basis of an operating condition of the internal combustion engine; a variation component separation unit 54 which separates the valve opening command signal from the opening command signal output unit 52 into a basic component and a variation component generated so as to be superimposed on the basic component; a variation component determination unit 56 which determines whether the EGR control valve is in a steady state or a transient state on the basis of a magnitude of the variation component separated by the variation component separation unit 54; and an EGR control valve diagnosis device 58 that performs an abnormality diagnosis on the EGR control valve when the variation component determination unit determines that the EGR control valve is in the steady state.

4 Claims, 6 Drawing Sheets

(52) U.S. Cl.
CPC .......... *F02M 26/05* (2016.02); *F02M 26/49* (2016.02); *Y02T 10/47* (2013.01)

(58) Field of Classification Search
CPC .......... F02D 41/0077; F02D 41/0047; F02D 41/005; F02D 41/1401; F02D 2041/1409
USPC ....... 123/568.11, 568.16, 568.21; 73/114.74; 701/108
See application file for complete search history.

(56) References Cited

U.S. PATENT DOCUMENTS

| | | | |
|---|---|---|---|
| 5,113,835 A * | 5/1992 | Seki et al. | 123/568.16 |
| 5,632,257 A | 5/1997 | Machida et al. | |
| 5,771,869 A * | 6/1998 | Yoshihara et al. | 123/568.16 |
| 5,943,999 A | 8/1999 | Yoshihara et al. | |
| 6,837,226 B2 * | 1/2005 | Wang et al. | 123/568.16 |
| 7,062,910 B2 * | 6/2006 | Inoue | 60/605.2 |
| 2004/0012364 A1 | 1/2004 | Fujita et al. | |
| 2008/0202482 A1 | 8/2008 | Furuta et al. | |

FOREIGN PATENT DOCUMENTS

| | | |
|---|---|---|
| EP | 1 288 469 A2 | 3/2003 |
| JP | 7-247913 A | 9/1995 |
| JP | 9-329061 A | 12/1997 |
| JP | 10-122058 A | 5/1998 |
| JP | 11-141405 A | 5/1999 |
| JP | 2002-349357 A | 12/2002 |
| JP | 2007-255251 A | 10/2007 |
| JP | 2008-208781 A | 9/2008 |

OTHER PUBLICATIONS

Decision to Grant a Patent dated Dec. 27, 2013 issued in the corresponding JP Application No. 2010-211406 with an English translation.
Notice of Allowance dated May 6, 2015 issued in corresponding Chinese Application No. 201180026862.6 with English Translation.
Indian Examination Report, dated Mar. 27, 2018, for Indian Application No. 10422/DELNP/2012.

* cited by examiner

EXHAUST GAS RECIRCULATION DEVICE FOR INTERNAL COMBUSTION ENGINE

TECHNICAL FIELD

The present invention relates to an exhaust gas recirculation device (abbreviated hereafter to EGR) for an internal combustion engine, and more particularly to precise determination of a fault in an EGR control valve.

BACKGROUND ART

An EGR is conventionally provided to reduce NOx discharge from an internal combustion engine.

Further, an EGR gas control valve for controlling an EGR gas amount is conventionally provided in an EGR gas passage that connects an exhaust gas passage and an intake air passage to each other, and a valve opening amount of the EGR control valve is controlled by outputting an EGR control valve opening command signal to the EGR control valve to realize a target EGR valve opening determined in accordance with operating conditions of the internal combustion engine.

However, when a fault occurs in the EGR control valve such that an accurate target EGR valve opening is not obtained in response to the EGR control valve opening command signal, an exhaust gas purification performance and an output performance of the internal combustion engine deteriorate. Therefore, various proposals have been made in the background art in relation to techniques for diagnosing a fault in an EGR control valve accurately and precisely.

For example, Japanese Patent Application Publication No. H10-122058 (Patent Document 1) discloses a technique in which, when an EGR operation condition according to which a target opening of an EGR control valve varies by at least a predetermined amount is established, an actual opening detection unit detects an actual opening, which varies so as to follow variation in the target opening, from the start of the variation in the target opening, and a fault is determined to have occurred in a device including the EGR control valve when it is confirmed that the detected actual opening is not varying so as to follow the target opening.

Further, Japanese Patent Application Publication No. 2007-255251 (Patent Document 2) discloses a technique for a device including an EGR control valve having a valve shaft, a driving unit which is disposed on an extension line of the valve shaft and includes a reciprocating drive shaft that reciprocates in an axial direction, and a control unit, wherein the reciprocating drive shaft of the driving unit is configured to open the EGR control valve by pressing a tip end of a central shaft of the EGR control valve when the driving unit is operative. In this technique, a determination as to whether or not a fault has occurred in an EGR control valve is made by determining whether a duty ratio of a control signal issued to the driving unit from the control unit is within or beyond an allowable range.

Patent Document 1: Japanese Patent Application Publication No. H10-122058

Patent Document 2: Japanese Patent Application Publication No. 2007-255251

In many cases, a fault in a control valve is caused by an increase in sliding friction resistance in a valve driving unit. Valve sliding friction causes a stick slip phenomenon, in which catching and sliding occur repeatedly during opening variation, and so on, and a deviation is particularly likely to appear in response to minute opening variation. Therefore, to detect abnormal phenomena early, it is advantageous to focus on a following error occurring in response to minute opening variation.

However, Patent Documents 1 and 2 disclose techniques of determining an abnormality on the basis of a deviation from an actual opening and a duty ratio range of a driving control signal rather than techniques for detecting abnormal phenomena by focusing on the following error occurring in response to minute opening variation.

It is therefore necessary to develop a technique for determining a fault in an EGR control valve with improved accuracy and precision.

DISCLOSURE OF THE INVENTION

The present invention has been designed in consideration of this problem, and an object thereof is to provide an exhaust gas recirculation device for an internal combustion engine with which a fault in an EGR control valve provided in the exhaust gas recirculation device can be determined with improved precision.

To achieve this object, the present invention is an exhaust gas recirculation control device for an internal combustion engine, having an EGR control valve that is provided in an EGR gas passage connecting an exhaust passage and an intake passage in order to control an EGR gas amount, the exhaust gas recirculation device including: an opening command signal output unit which outputs an opening command signal in relation to the EGR control valve on the basis of an operating condition of the internal combustion engine; a variation component separation unit which separates the valve opening command signal from the opening command signal output unit into a basic component and a variation component generated so as to be superimposed on the basic component; a variation component determination unit which determines whether the EGR control valve is in a steady state or a transient state on the basis of a magnitude of the variation component separated by the variation component separation unit; and an EGR control valve diagnosis device that performs an abnormality diagnosis on the EGR control valve when the variation component determination unit determines that the EGR control valve is in the steady state.

According to this invention, the EGR control valve diagnosis device that performs an abnormality diagnosis on the EGR control valve is activated only when the EGR control valve is in the steady state, and therefore erroneous determinations occurring when a determination is made on the basis of a transient state signal can be prevented.

More specifically, in the transient state where an opening command value of the EGR control valve varies greatly, a deviation between the opening command signal and an actual opening signal inevitably appears due to a following delay in the EGR control valve even if the EGR control valve is sound. By removing this unavoidable deviation from the abnormality diagnosis subject, the precision of the abnormality diagnosis can be improved.

Further, a fault in the EGR control valve is often caused by an increase in sliding friction resistance in a valve driving unit. Valve sliding friction causes a stick slip phenomenon, in which catching and sliding occur repeatedly during opening variation, and so on, and therefore a deviation is particularly likely to appear in response to minute opening variation. Therefore, to detect abnormal phenomena early, it is advantageous to focus on the following error that occurs in response to minute opening variation.

In the present invention, the opening command signal and the actual opening signal in the steady state, i.e. not the transient state, are used, and therefore a highly precise abnormality determination focusing on a following error occurring in response to minute opening variation can be made, which is advantageous in terms of early detection of abnormal phenomena.

Further, in the present invention, the variation component separation unit preferably includes: a basic component calculation unit which calculates the basic component of the valve opening command signal from the valve opening command signal; and an adder-subtractor which subtracts the basic component calculated by the basic component calculation unit from the valve opening command signal, and the variation component separation unit calculates the valve opening command signal variation component by subtracting the basic component from the valve opening command signal using the adder-subtractor.

Thus, the variation component separation unit includes the basic component calculation unit and the adder-subtractor which subtracts the basic component calculated by the basic component calculation unit from the valve opening command signal, and the valve opening command signal variation component is calculated by subtracting the basic component from the valve opening command signal using the adder-subtractor.

Further, the basic component calculation unit preferably includes: a variation component removal dead zone device; a correction gain device which corrects an output signal of the variation component removal dead zone device; and an integrator which integrates an output signal of the correction gain device.

Hence, by having the basic component calculation unit multiply a correction gain by the signal from which the variation component has been removed by the variation component removal dead zone device, superior characteristics are obtained in comparison with noise component removal through simple filter processing in terms of advancement of a rise time of the signal and removal of the variation component.

Further, in the present invention, the variation component determination unit preferably includes: a steady state determination device that determines whether or not a signal of the valve opening command signal variation component generated by subtracting the basic component from the valve opening command signal using the adder-subtractor is within a threshold; and an on-delay timer that switches ON when an output within the threshold is continued for a fixed time.

With this configuration, the steady state can be determined accurately, enabling an improvement in the precision of the abnormality diagnosis.

Further, in the present invention, the EGR control valve diagnosis device preferably performs the abnormality diagnosis on the basis of a valve opening command signal input into the EGR control valve and an actual opening signal relating to the EGR control valve, and the valve opening command signal input into the EGR control valve is preferably the valve opening command signal from the opening command signal output unit.

With this configuration, the precision of the abnormality diagnosis performed by the EGR control valve diagnosis device on the basis of the deviation between the valve opening command signal input into the EGR control valve and the actual opening signal of the EGR control valve is improved.

Further, in the present invention, the EGR control valve diagnosis device preferably performs the abnormality diagnosis on the basis of a valve opening command signal input into the EGR control valve and an actual opening signal relating to the EGR control valve, and the valve opening command signal input into the EGR control valve is preferably a signal of the basic component separated by the variation component separation unit.

Hence, the valve opening command signal input into the EGR control valve is the signal of the basic component of the valve opening command signal separated by the variation component separation unit, and therefore the EGR control valve is not affected by the variation component included in the valve opening command signal. Accordingly, the EGR control valve can be prevented from moving in small motions due to the variation component, and therefore unnecessary movement of the EGR control valve can be prevented, leading to improvements in the durability and lifespan thereof.

FIG. 9 shows an operating characteristic of the EGR control valve and a characteristic of a valve flow rate relative to the valve opening.

When the valve opening increases to or above a certain opening, a dead zone region R in which the valve flow rate exhibits substantially no variation relative to the valve opening exists. In this region, a valve opening b must be varied greatly in response to even small flow rate variation a, and since valve opening variation is required in response to minute flow rate variation, the EGR control valve opens and closes frequently in small motions. By providing a hysteresis characteristic to differentiate valve openings during opening and closing operations in order to prevent these small motions, unnecessary small motions of the EGR control valve are suppressed.

When hysteresis is provided, however, the opening command signal of the EGR control valve at which the hysteresis characteristic switches ON and the opening command signal at which the hysteresis characteristic switches OFF are fixed, and therefore a steady state deviation occurs between the actual valve opening command signal and the valve opening command signal following application of the hysteresis characteristic when seen as a time average. When the steady state deviation is generated, the valve opening may oscillate constantly.

In the present invention, the opening command signal input into the EGR control valve is the signal of the basic component separated by the variation component separation unit, and therefore these small motions and oscillation based on an action of the hysteresis characteristic can be suppressed, enabling improvements in durability and lifespan.

According to the present invention, an exhaust gas recirculation device for an internal combustion engine includes: an opening command signal output unit which outputs an opening command signal in relation to an EGR control valve on the basis of an operating condition of the internal combustion engine; a variation component separation unit which separates the valve opening command signal from the opening command signal output unit into a basic component and a variation component generated so as to be superimposed on the basic component; a variation component determination unit which determines whether the EGR control valve is in a steady state or a transient state on the basis of a magnitude of the variation component separated by the variation component separation unit; and an EGR control valve diagnosis device that performs an abnormality diagnosis on the EGR control valve when the variation component determination unit determines that the EGR control valve is in the steady state. Therefore, in the transient state where the opening command value of the EGR control valve varies greatly, a deviation between the opening command signal and the actual opening signal inevitably occurs due to a following delay in the EGR control valve even if the EGR control valve is sound. By removing this unavoidable deviation from the abnormality diagnosis subject, the precision of the abnormality diagnosis can be improved.

Further, a fault in the EGR control valve is often caused by an increase in sliding friction resistance in the valve driving unit. Valve sliding friction causes a stick slip phenomenon, in which catching and sliding occur repeatedly during opening variation, and so on, and therefore a deviation is particularly likely to appear in response to minute opening variation. Hence, to detect abnormal phenomena early, it is advantageous to focus on the following error that occurs in response to minute opening variation. In the present invention, the valve opening command signal and the actual opening signal in the steady state, i.e. not the transient state, are used, and therefore an abnormality determination focusing on the following error generated in response to minute opening variation can be made, which is advantageous in terms of early detection of abnormal phenomena.

BEST MODES FOR CARRYING OUT THE INVENTION

Figure 1:
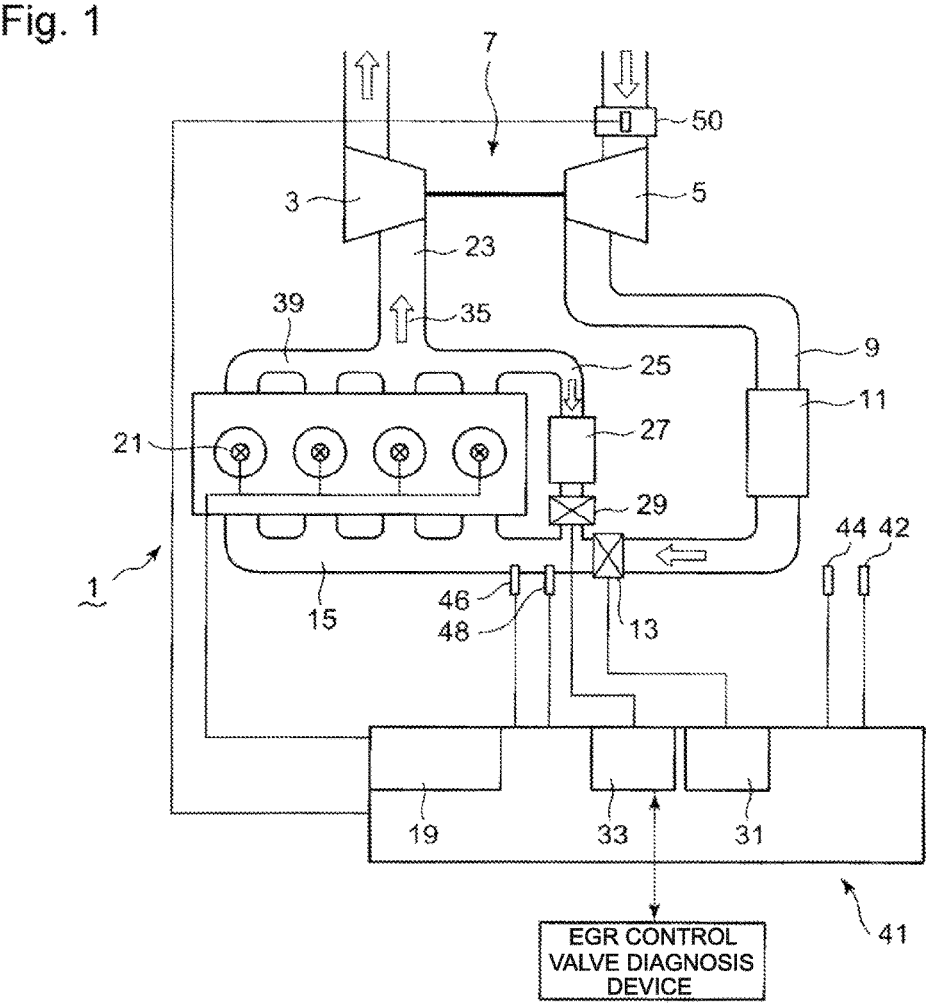
FIG. 1 is a view showing an overall configuration of an exhaust gas recirculation device for an internal combustion engine according to an embodiment of the present invention.

The present invention will be described in detail below using embodiments shown in the drawings. Note, however, that unless specific description is provided to the contrary, dimensions, materials, shapes, relative arrangements, and so on of constituent components described in the embodiments are not intended to limit the scope of the present invention.

First Embodiment

Referring to FIG. 1, an exhaust gas recirculation device for an internal combustion engine according to a first embodiment of the present invention will be described.

As shown in FIG. 1, a diesel engine (to be referred to hereafter as an engine) 1 includes an exhaust gas turbocharger 7 having an exhaust gas turbine 3 and a compressor 5 that is driven coaxially with the exhaust gas turbine 3. Air discharged from the compressor 5 of the exhaust gas turbocharger 7 passes through an air supply passage 9 and enters an intercooler 11 to be cooled. An air supply flow rate is then controlled by an intake air throttle valve 13, whereupon the air flows through an intake manifold 15 to an intake port provided in each cylinder, and flows from the intake port into a combustion chamber via an intake valve of the engine 1.

The engine 1 is further provided with a fuel injection control device 19 that injects fuel into the combustion chamber while controlling an injection timing, an injection amount, and an injection pressure of the fuel. The fuel injection control device 19 supplies a fuel injection valve 21 provided for each cylinder with fuel controlled to a predetermined fuel pressure at a predetermined fuel injection timing.

Further, an EGR (Exhaust Gas Recirculation) passage 25 bifurcates from a midway point of an exhaust passage 23 such that a part of an exhaust gas is cooled by an EGR cooler 27 and introduced into a site downstream of the intake air throttle valve 13 via an EGR control valve 29. A throttle valve control device 31 is provided in relation to the intake air throttle valve 13 to control opening/closing thereof, and an EGR control device (an exhaust gas recirculation control device) 33 is provided in relation to the EGR control valve 29 to control opening/closing thereof.

Combustion gas burned in the combustion chambers of the engine 1, or in other words exhaust gas 35, passes through an exhaust manifold 39, where exhaust ports provided for the respective cylinders converge, and the exhaust passage 23, drives the exhaust gas turbine 3 of the exhaust gas turbocharger 7, thereby serving as a power supply of the compressor 5, and then flows into an exhaust gas post-treatment device (not shown) through the exhaust passage 23.

An engine rotation speed signal from an engine rotation speed sensor 42 and an engine load signal from an engine load sensor 44 are respectively input into a control device (ECU) 41 together with a detection signal from an intake manifold temperature sensor 46 provided in the intake manifold 15, a detection signal from an intake manifold pressure sensor 48, and a detection signal from an air flow meter 50.

The EGR control device (exhaust gas recirculation control device) 33 includes an opening command signal output unit 52 which calculates an EGR flow rate corresponding to operating conditions on the basis of the signals from the respective sensors using a preset EGR amount map or a calculation formula and outputs an opening command signal relating to the EGR control valve 29 on the basis of the calculated EGR amount, a variation component separation unit 54 which separates the valve opening command signal from the opening command signal output unit 52 into a basic component and a variation component generated so as to be superimposed on the basic component, and a variation component determination unit 56 which determines whether the EGR control valve 29 is in a steady state or a transient state on the basis of a magnitude of the variation component of the valve opening command signal separated by the variation component separation unit.

When the steady state is determined by the variation component determination unit 56, a steady state signal is output to cause an EGR control valve diagnosis device 58 which performs abnormality diagnoses on the EGR control valve 29 to execute a diagnosis.

Figure 2:
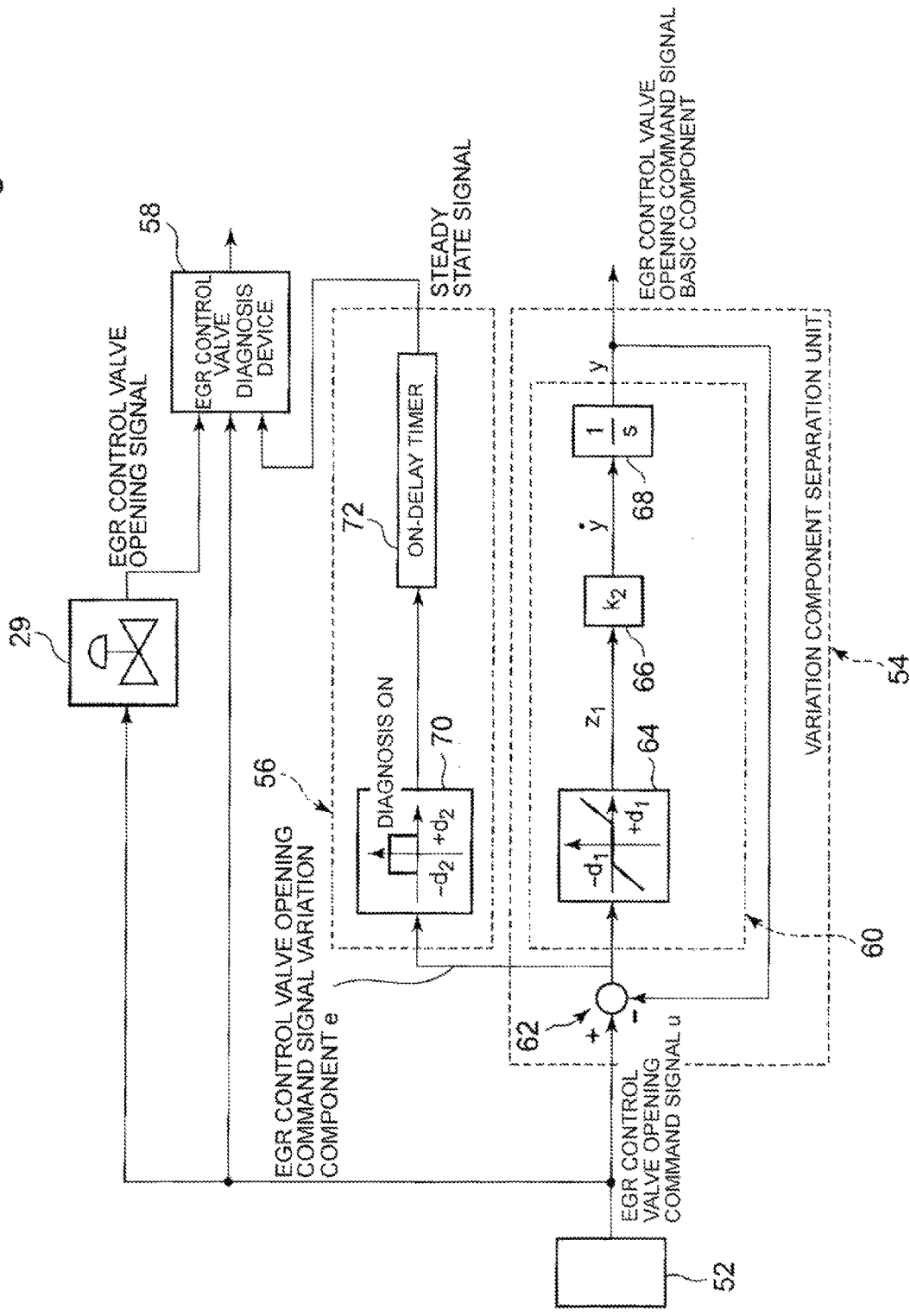
FIG. 2 is a block diagram showing a configuration of an EGR control device according to a first embodiment.

Referring to FIG. 2, the variation component separation unit 54 and the variation component determination unit 56 will be described.

The variation component separation unit 54 includes a basic component calculation unit 60 which calculates the basic component of the valve opening command signal output by the opening command signal output unit 52 from the valve opening command signal, and an adder-subtractor 62 which subtracts the basic component calculated by the basic component calculation unit 60 from the valve opening command signal. The adder-subtractor 62 calculates the variation component of the valve opening command signal by subtracting the basic component from the valve opening command signal.

Further, the basic component calculation unit 60 includes a variation component removal dead zone device 64, a basic component correction gain device (correction gain device) 66 which corrects an output signal from the variation component removal dead zone device 64, and an integrator 68 which integrates output signals from the correction gain device 66.

Furthermore, the variation component determination unit 56 includes a steady state determination device 70 that determines whether or not a signal of the valve opening command signal variation component generated by subtracting the basic component from the valve opening command signal using the adder-subtractor 62 is within a threshold, and an on-delay timer 72 that performs output after determining that an output within the threshold has continued for a fixed time.

Next, the basic component calculation unit 60 of the variation component separation unit 54 will be described in further detail. To describe the basic component calculation unit 60, u, $z_1$, and y are appended to signals. Note that
$$\dot{y}$$
denotes a signal obtained through temporal differentiation of y.

Figure 4:
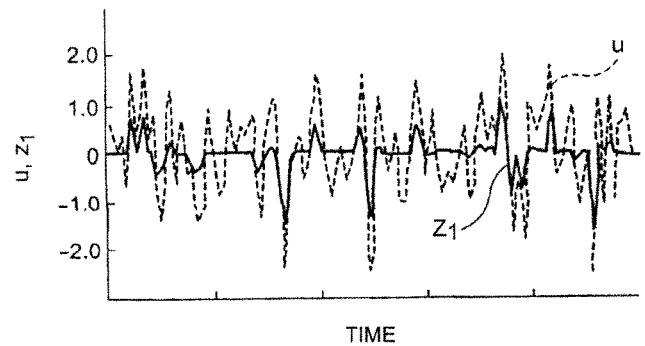
FIG. 4 is an illustrative view illustrating an operation of a variation component removal dead zone device.

It is assumed that the basic component of an EGR control valve opening command signal u is zero, and varies irregularly thereabout. When, at this time, a value of a set threshold $d_1$ of the variation component removal dead zone device 64 is set at 1, an output signal $z_1$ is as shown in FIG. 4. It can be seen that $z_1$ varies only when a magnitude of u exceeds 1, and that a minute variation component included in u is removed. Hence, the variation component removal dead zone device 64 has a function for removing the minute variation component included in u. Note that $d_1$ is adjusted in accordance with the magnitude of the minute variation component included in u.

Hence, if a time average value of the EGR control valve opening command signal u were zero, the variation component of the EGR control valve opening command signal u could be removed by the variation component removal dead zone device 64 alone. In reality, however, a basic wave component of the EGR control valve opening command signal u is not fixed at zero, and therefore the dead zone is exceeded by only the basic wave component of the EGR control valve opening command signal u.

Hence, the variation component cannot be removed, and therefore, to cause the variation component removal dead zone device 64 to function effectively, a basic component y of the EGR control valve opening command signal is estimated and subtracted from the EGR control valve opening command signal u such that an input signal input into the variation component removal dead zone device 64 varies about zero irrespective of the value of the basic wave component of the EGR control valve opening command signal u.

A basic component correction gain $k_2$ of the basic component correction gain device 66 is a coefficient for adjusting an estimation speed of the basic component. When the output signal $z_1$ of the variation component removal dead zone device 64 outputs a positive value, the basic component y is increased by a value obtained by multiplying this value by $k_2$. When $z_1$ outputs a negative value, the basic component is reduced by a value obtained by multiplying this value by $k_2$. By performing this operation repeatedly, the EGR control valve opening command signal u converges on a steady state value. Convergence is achieved more quickly as the correction gain $k_2$ increases.

Next, results of a numerical value simulation confirming the effect of the basic component calculation unit 60 will be described.

Figure 5:
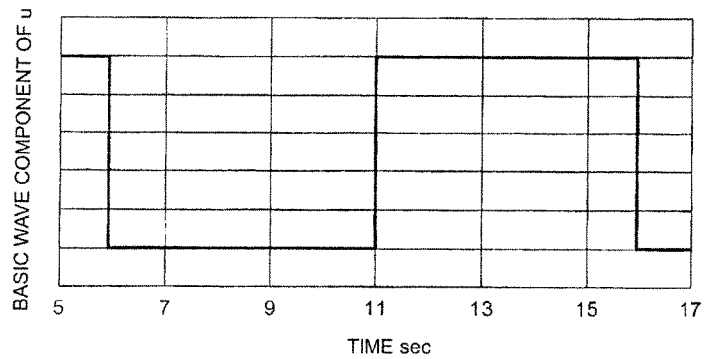
FIG. 5 is an illustrative view showing a basic component wave in a numerical value simulation verification test.

In the simulation, white noise is superimposed as a variation component on a basic wave component shown in FIG. 5. A solid line X in FIG. 6 denotes an EGR control valve opening command signal used in the simulation, while a dashed line denotes the basic component y of the EGR control valve opening command signal. It is evident from FIG. 7, which is an enlarged view of an E portion in FIG. 6, that the variation component has been removed.

Figure 6:
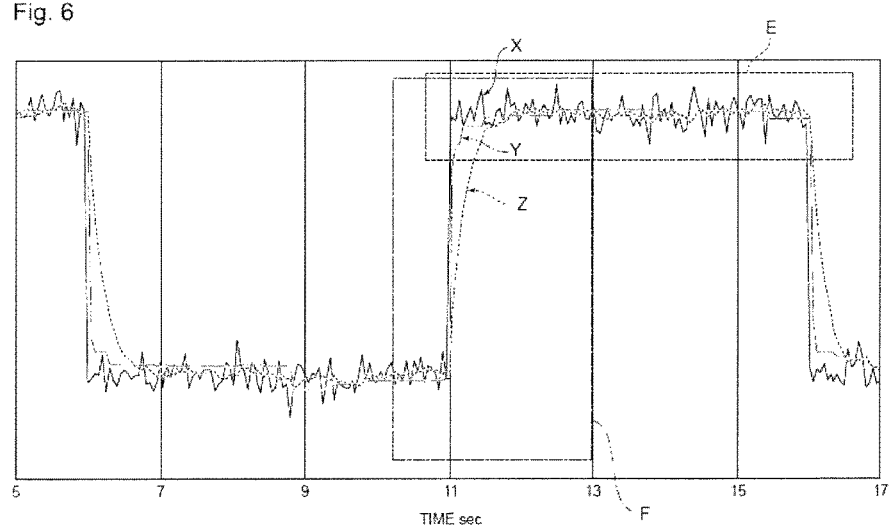
FIG. 6 is an illustrative view showing results of the numerical value simulation verification test.
Figure 7:
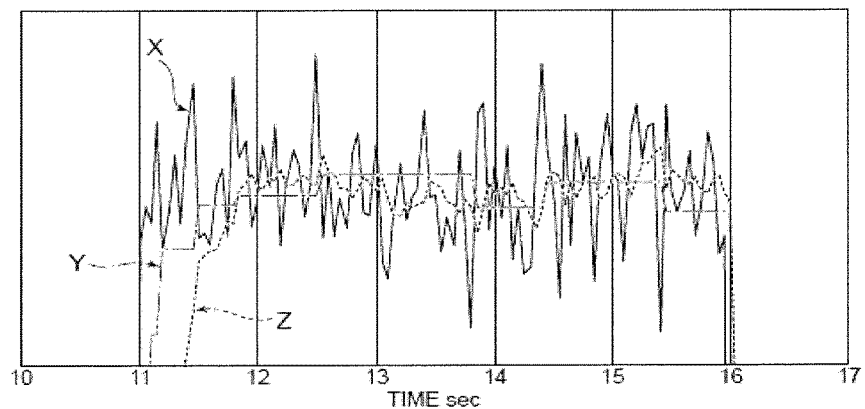
FIG. 7 is an enlarged view of an E portion of FIG. 6.
Figure 8:
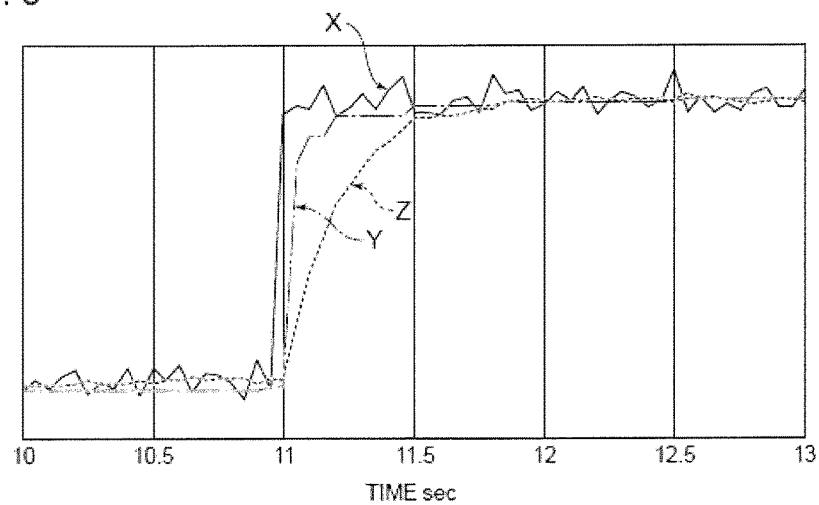
FIG. 8 is an enlarged view of an F portion of FIG. 6.

A filter such as a first order lag filter is typically used to remove the variation component. A dotted line in FIGS. 6, 7, and 8 is an estimated value
$$\hat{y}|$$
of a basic component generated by a first order lag filter. When the first order lag of the filter is set at a time constant of 0.2 seconds, for example, an arithmetic expression is expressed as follows.

$$\hat{y} = \frac{1}{0.2s+1}u\Big|$$

FIG. 8 is an enlarged view of an F portion in FIG. 6, and shows a rising part. A rising speed of the estimated value
$$\hat{y}|$$
of the basic component generated by the first order lag is clearly lower than that of this embodiment. To obtain an equal rising speed to that of this simulation, the time constant of the filter must be reduced, but as shown in FIG. 8, the variation component remains in the estimated value
$$\hat{y}|$$
of the basic component generated by the first order lag, and therefore, when the time constant of the filter is reduced, the variation component becomes even more apparent.

It was possible to confirm from the results of the simulation that in comparison with a conventional filter method, the method according to this embodiment exhibits superior characteristics in terms of both the rise of the signal and removal of the variation component.

Next, returning to the overall block diagram of FIG. 2, the variation component determination unit 56 will be described. As described above, the variation component determination unit 56 includes the steady state determination device 70, and the on-delay timer 72 that performs output after determining that an output within the threshold has continued for a fixed time. An EGR control valve opening command signal variation component (a variation component) e obtained by removing the basic component y of the EGR control valve opening command signal from the EGR control valve opening command signal u is input into the steady state determination device 70, and a determination is made as to whether or not the resulting signal is a signal within a set threshold $d_2$ on the basis of whether or not the input variation component is a variation component of a transient state or a variation component of a steady state, i.e. a state that cannot be considered transient.

Further, the on-delay timer 72 determines that the output of the steady state determination device 70, or in other words an output within the set threshold $d_2$, has continued for a fixed time.

Hence, when an ON signal is output from the on-delay timer 72, the ON signal is output as a signal of a determination result indicating the steady state.

The steady state is determined by the on-delay timer after the continuous fixed time, and therefore the steady state can be determined accurately, enabling an improvement in the precision of the abnormality diagnosis.

As shown in FIG. 2, the steady state signal output by the on-delay timer 72 is output to the EGR control valve diagnosis device 58. To diagnose whether or not the EGR control valve 29 is operating correctly, the EGR control valve diagnosis device 58 takes in the signal of the EGR control valve opening command signal u, or in other words a command value in the steady state, i.e. not the transient state, and an actually measured value of the EGR control valve 29, calculates a valve opening deviation h, and determines whether or not an absolute value |h| of the deviation h is larger than an allowable value.

The allowable value is an upper limit value of |h| allowable during use of the EGR control valve 29. Further, the allowable value is set in advance for each individual EGR control valve 29.

When |h| is larger than the allowable value and this state continues for a fixed time, the EGR control valve 29 is determined to be abnormal and notification of this result is issued.

According to the first embodiment, as described above, the EGR control valve diagnosis device 58 that performs an abnormality diagnosis on the EGR control valve 29 is activated only when the EGR control valve is in a steady state, and therefore an erroneous determination obtained on the basis of a transient state signal can be prevented.

More specifically, in the transient state where the opening command value of the EGR control valve 29 varies greatly, the deviation |h| between the opening command signal and the actual opening signal occurs due to a following delay in the EGR control valve 29 even if the EGR control valve 29 is sound. Moreover, the deviation |h| is generated as a large deviation, and therefore an erroneous determination of an abnormality cannot be avoided. By removing this unavoidable deviation from the abnormality diagnosis subject, the precision of the abnormality diagnosis can be improved.

Further, a fault in the EGR control valve 29 is often caused by an increase in sliding friction resistance in the valve driving unit. Valve sliding friction causes a stick slip phenomenon, in which catching and sliding occur repeatedly during opening variation, and so on, and therefore a deviation is particularly likely to appear in response to minute opening variation. Therefore, to detect abnormal phenomena early, it is advantageous to focus on the following error that occurs in response to minute opening variation.

By using the opening command signal and the actual opening signal in the steady state, i.e. not the transient state, a highly precise abnormality determination focusing on the following error that occurs in response to minute opening variation can be made, which is advantageous in terms of early detection of abnormal phenomena.

Second Embodiment

A second embodiment will be described with reference to a block diagram in FIG. 3. In the second embodiment, the signal of the basic component of the EGR control valve opening command signal, which is separated by being passed through the variation component separation unit 54, is input into the EGR control valve 29 in place of the EGR control valve opening command signal u input into the EGR control valve 29 in the first embodiment. All other configurations are similar to the first embodiment, and therefore description thereof has been omitted.

Figure 3:
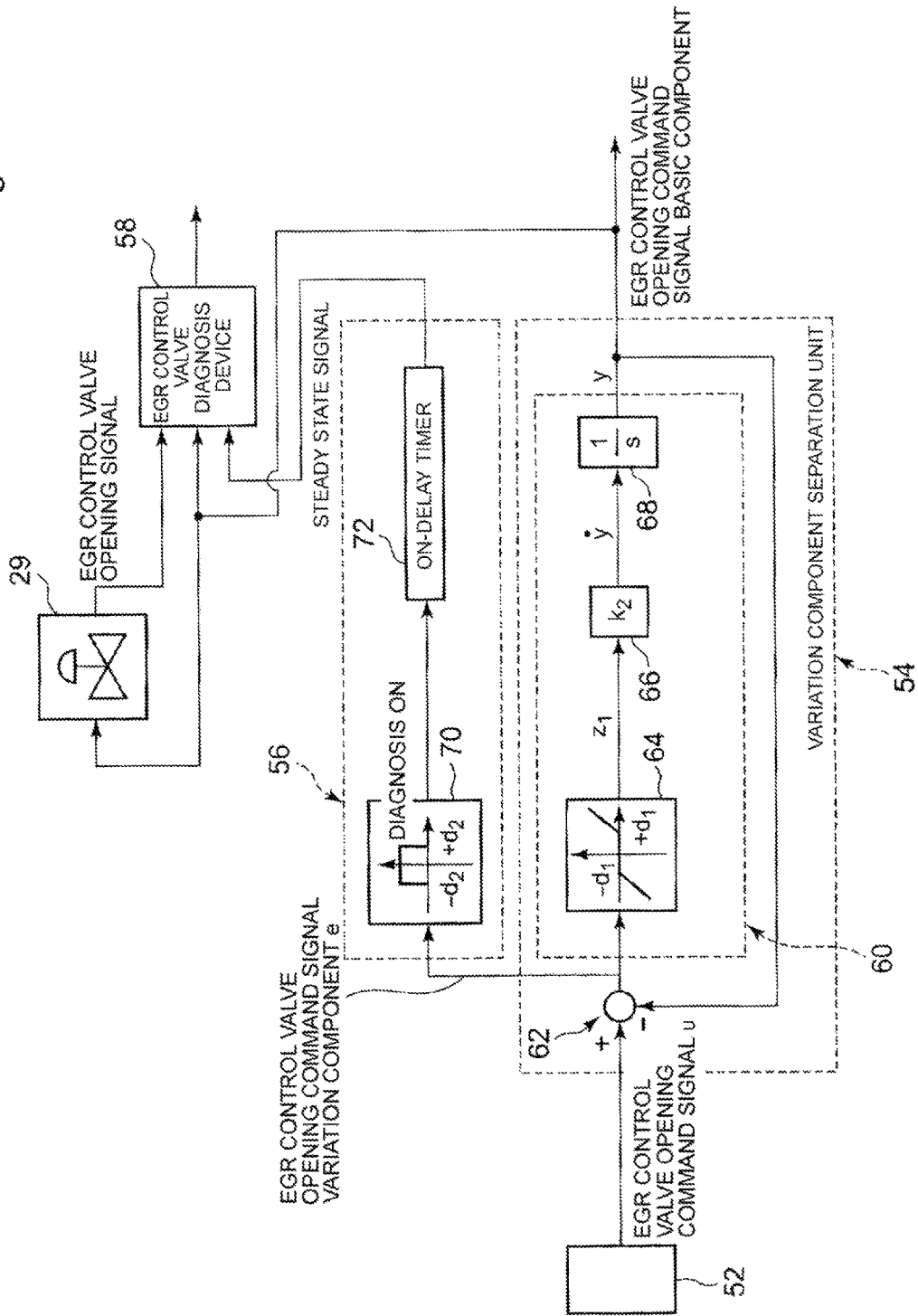
FIG. 3 is a block diagram showing a configuration of an EGR control device according to a second embodiment.

As shown in FIG. 3, in the second embodiment, the opening command signal input into the EGR control valve 29 is the signal of the basic component of the valve opening command signal separated by the variation component separation unit 54, and therefore the EGR control valve 29 is not affected by the variation component included in the valve opening command signal. Hence, the EGR control valve 29 can be prevented from being moved in small motions by the variation component, and therefore unnecessary movement of the EGR control valve 29 can be prevented, leading to improvements in the durability and lifespan of the EGR control valve 29.

Figure 9:
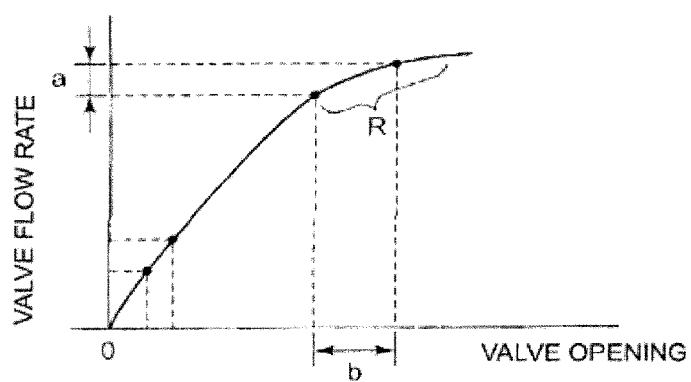
FIG. 9 is an illustrative view showing valve opening and valve flow rate characteristics of an EGR control valve.

As shown in FIG. 9, a dead zone region R exists in the characteristics of the EGR control valve. In this region, unnecessary small motions occur, and even when a hysteresis function is applied to prevent these small motions, constant oscillation occurs. According to the second embodiment, however, the opening command signal input into the EGR control valve 29 is the signal corresponding to the basic component of the valve opening command signal separated by the variation component separation unit 54, and therefore these small motions and constant oscillation can be avoided, leading to improvements in the durability and lifespan of the EGR control valve 29.

Further, since the operation of the EGR control valve 29 is controlled by the signal of the basic component of the valve opening command signal separated by the variation component separation unit 54, the valve opening of the EGR control valve 29 is controlled accurately and reliably.

Moreover, as described above in the first embodiment, in comparison with the conventional first order lag filter method, the signal of the basic component of the valve opening command signal separated by the variation component separation unit 54 has superior characteristics in terms of the rise of the signal and removal of the variation component, and is therefore also effective in improving a responsiveness of an operation of the EGR control valve 29, an exhaust gas performance of the engine, and an output performance of the engine.

In other words, according to the second embodiment, in addition to the action and effects obtained by the first embodiment in terms of improving the fault determination precision of the EGR control valve diagnosis device 58 that performs abnormality diagnoses on the EGR control valve 29, improvements in the durability and lifespan of the EGR control valve can be obtained, as well as an improvement in an exhaust gas purification action of the EGR control valve 29 itself.

Third Embodiment

Figure 10:
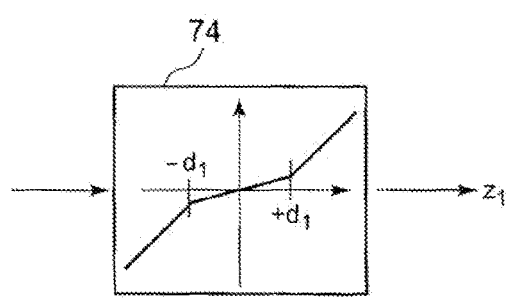
FIG. 10 is a characteristic diagram of a variation component removal dead zone device according to a third embodiment.

A third embodiment will be described with reference to FIG. 10. In the first and second embodiments, the variation component removal dead zone device 64 is used in the basic component calculation unit 60.

However, the actions and effects of this application are not limited to a characteristic such as that of a variation component removal function set by the variation component removal dead zone device 64, which reaches zero using the set threshold $d_1$ as a threshold. The third embodiment uses a variation component removal function in which an incline in the vicinity of an origin, instead of a zero dead zone, is set to be small, the variation component removal function being set by a variation component removal dead zone device 74 shown in FIG. 10.

As a result, similar effects to those of the first and second embodiments can be obtained.

Fourth Embodiment

Figure 11:
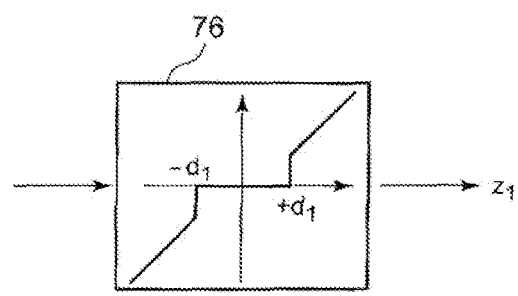
FIG. 11 is a characteristic diagram of a variation component removal dead zone device according to a fourth embodiment.

A fourth embodiment will be described with reference to FIG. 11. In the fourth embodiment, as shown in FIG. 11, the variation component removal function set in a variation component removal dead zone device 76 rises in step form from the set threshold $d_1$ and then increases on an incline. Likewise when this variation component removal function is used, similar effects to those of the first and second embodiments can be obtained.

In the first to fourth embodiments, a characteristic whereby zero is reached or a gradient is reduced in the vicinity of the origin is essential, and as long as this characteristic is set, the effects of this application can be obtained.

INDUSTRIAL APPLICABILITY

According to the present invention, the precision with which a fault is determined in an EGR control valve provided in an exhaust gas recirculation device can be improved, and therefore the present invention is suitable for use in an exhaust gas recirculation device for an internal combustion engine.

The invention claimed is:

1. An exhaust gas recirculation (EGR) device for an internal combustion engine, the EGR device comprising:
   an exhaust gas recirculation (EGR) control valve provided in an EGR gas passage connecting an exhaust passage and an intake passage in order to control an EGR gas amount; and
   an EGR control device that controls the opening and closing of the EGR control valve;
   wherein the EGR control device is configured to:
      output an opening command signal in relation to the EGR control valve on the basis of an operating condition of the internal combustion engine;
      separate the valve opening command signal into a basic component and a variation component generated to be superimposed on the basic component;
      determine whether the EGR control valve is in a steady state or a transient state on the basis of a magnitude of the variation component, the EGR control device determining the EGR control valve is in the steady state when the variation component within a threshold is continued for a fixed time;
      calculate the valve opening deviation based on the valve opening command signal input into the EGR control valve and an actual measured opening signal relating to the EGR control valve when the EGR control valve is determined to be in the steady state; and
      provide the basic component separated from the valve opening command signal to an input of the EGR control valve.

2. The exhaust recirculation device for an internal combustion engine according to claim 1, wherein the EGR control device further comprises:
   a basic component calculation unit configured to calculate the basic component of the valve opening command signal from the valve opening command signal; and
   an adder-subtractor configured to separate the variation component from the valve opening command signal by subtracting the calculated basic component from the valve opening command signal.

3. The exhaust gas recirculation device for an internal combustion engine according to claim 2, wherein the basic component calculation unit further comprises:
   a variation component removal dead zone device configured to remove the variation component included in the valve opening command signal;
   a correction gain device configured to correct an output signal of the variation component removal dead zone device; and
   an integrator configured to integrate an output signal the correction gain device.

4. The exhaust gas recirculation device for an internal combustion engine according to claim 2, wherein the EGR control device further comprises:
   a steady state determination device configured to determine whether or not the variation component generated by subtracting the basic component from the valve opening command signal using the adder-subtractor is within the threshold; and
   an on-delay timer configured to switch ON when the variation component is continuously within the threshold for the fixed time;
   wherein EGR control device determines the EGR control valve is in the steady state when the on-delay timer switches ON.

\* \* \* \* \*